(12) United States Patent  
Tennican et al.

(10) Patent No.: US 7,590,625 B1  
(45) Date of Patent: Sep. 15, 2009

(54) METHOD AND SYSTEM FOR NETWORK LOAD BALANCING WITH A COMPOUND DATA STRUCTURE

(75) Inventors: Scott P. Tennican, Seattle, WA (US); Bryan D. Skene, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 323 days.

(21) Appl. No.: 11/532,876

(22) Filed: Sep. 18, 2006

Related U.S. Application Data

(63) Continuation of application No. 09/596,796, filed on Jun. 19, 2000, now Pat. No. 7,146,354.

(60) Provisional application No. 60/140,272, filed on Jun. 18, 1999.

(51) Int. Cl.  
*G06F 17/30* (2006.01)

(52) U.S. Cl. .......................................... 707/3

(58) Field of Classification Search .............. 707/2, 707/3, 102; 711/136  
See application file for complete search history.

(56) References Cited

U.S. PATENT DOCUMENTS

| | | |
|---|---|---|
| 3,950,735 A | 4/1976 | Patel |
| 4,644,532 A | 2/1987 | George et al. |
| 4,829,427 A | 5/1989 | Green |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,325,525 A | 6/1994 | Shan et al. |
| 5,327,529 A | 7/1994 | Fults et al. |

(Continued)

FOREIGN PATENT DOCUMENTS

EP 0744850 A2 11/1996

(Continued)

OTHER PUBLICATIONS

"A Process for Selective Routing of Servlet Content to Transcoding Modules", Research Disclosure 422124, IBM Corporation, 4 pgs, Jun. 1999.

(Continued)

*Primary Examiner*—Etienne P LeRoux  
(74) *Attorney, Agent, or Firm*—Darby & Darby P.C.; Jamie L. Wiegand

(57) ABSTRACT

The invention provides for employing a complex data structure to optimize the retrieval of data over a network. The complex data structure includes two separate sub-data structures (Trie and List) that separately reference the same data objects in a data store. The Trie sub-data structure is used to fulfill a single data object request. The List sub-data structure is employed with function requests related to several data objects. Each data object is associated with a parent object that includes a list of every reference to the data object in both the Trie and List sub-data structures. A collector object is a type of data object that is associated with a member object and which includes a list of other related data/collector objects. When data associated with the collector object is requested, other data associated with the other data/collector objects on the member object list are automatically retrieved.

20 Claims, 10 Drawing Sheets

U.S. PATENT DOCUMENTS

| | | | |
|---|---|---|---|
| 5,367,635 | A | 11/1994 | Bauer et al. |
| 5,371,852 | A | 12/1994 | Attanasio et al. |
| 5,406,502 | A | 4/1995 | Haramaty et al. |
| 5,475,857 | A | 12/1995 | Dally |
| 5,507,030 | A | 4/1996 | Sites |
| 5,517,617 | A | 5/1996 | Sathaye et al. |
| 5,519,694 | A | 5/1996 | Brewer et al. |
| 5,519,778 | A | 5/1996 | Leighton et al. |
| 5,521,591 | A | 5/1996 | Arora et al. |
| 5,528,701 | A | 6/1996 | Aref |
| 5,581,764 | A | 12/1996 | Fitzgerald et al. |
| 5,596,742 | A | 1/1997 | Agarwal et al. |
| 5,606,665 | A | 2/1997 | Yang et al. |
| 5,611,049 | A | 3/1997 | Pitts |
| 5,663,018 | A | 9/1997 | Cummings et al. |
| 5,752,023 | A | 5/1998 | Choucri et al. |
| 5,752,244 | A | 5/1998 | Rose et al. |
| 5,761,484 | A | 6/1998 | Agarwal et al. |
| 5,768,423 | A | 6/1998 | Aref et al. |
| 5,774,660 | A | 6/1998 | Brendel et al. |
| 5,787,452 | A | 7/1998 | McKenna |
| 5,790,554 | A | 8/1998 | Pitcher et al. |
| 5,809,495 | A | 9/1998 | Loaiza |
| 5,873,075 | A | 2/1999 | Cochrane et al. |
| 5,875,296 | A | 2/1999 | Shi et al. |
| 5,892,914 | A | 4/1999 | Pitts |
| 5,919,247 | A | 7/1999 | Van Hoff et al. |
| 5,924,098 | A | 7/1999 | Kluge |
| 5,926,813 | A | 7/1999 | Chaudhuri et al. |
| 5,936,939 | A | 8/1999 | Des Jardins et al. |
| 5,946,690 | A | 8/1999 | Pitts |
| 5,949,885 | A | 9/1999 | Leighton |
| 5,959,990 | A | 9/1999 | Frantz et al. |
| 5,974,460 | A | 10/1999 | Maddalozzo, Jr. et al. |
| 5,983,281 | A | 11/1999 | Ogle et al. |
| 6,006,260 | A | 12/1999 | Barrick, Jr. et al. |
| 6,006,264 | A | 12/1999 | Colby et al. |
| 6,026,452 | A | 2/2000 | Pitts |
| 6,028,857 | A | 2/2000 | Poor |
| 6,035,326 | A | 3/2000 | Miles et al. |
| 6,051,169 | A | 4/2000 | Brown et al. |
| 6,078,956 | A | 6/2000 | Bryant et al. |
| 6,085,234 | A | 7/2000 | Pitts et al. |
| 6,092,196 | A | 7/2000 | Reiche et al. |
| 6,108,703 | A | 8/2000 | Leighton et al. |
| 6,111,876 | A | 8/2000 | Frantz et al. |
| 6,141,731 | A * | 10/2000 | Beardsley et al. ............ 711/136 |
| 6,175,835 | B1 | 1/2001 | Shadmon et al. |
| 6,192,370 | B1 | 2/2001 | Primsch et al. |
| 6,212,184 | B1 * | 4/2001 | Venkatachary et al. ...... 370/392 |
| 6,286,052 | B1 * | 9/2001 | McCloghrie et al. ........ 709/238 |
| 6,304,879 | B1 | 10/2001 | Sobeski et al. |
| 6,324,177 | B1 | 11/2001 | Howes et al. |
| 6,351,734 | B1 * | 2/2002 | Lautzenheiser et al. ......... 705/8 |
| 6,351,775 | B1 * | 2/2002 | Yu ............................ 709/238 |
| 6,473,406 | B1 * | 10/2002 | Coile et al. ................. 370/248 |
| 6,522,632 | B1 | 2/2003 | Waters et al. |
| 6,668,284 | B1 * | 12/2003 | Parkhurst .................... 719/313 |
| 6,804,766 | B1 | 10/2004 | Noel et al. |
| 2002/0083031 | A1 | 6/2002 | De Varax |
| 2002/0194167 | A1 | 12/2002 | Bakalash et al. |

FOREIGN PATENT DOCUMENTS

| | | |
|---|---|---|
| WO | WO-91/14326 | 9/1991 |
| WO | WO-95/05712 | 2/1995 |
| WO | WO-97/09805 | 3/1997 |
| WO | WO-97/45800 | 12/1997 |
| WO | WO-99/05829 | 2/1999 |
| WO | WO-99/06913 | 2/1999 |
| WO | WO-99/10858 | 3/1999 |
| WO | WO-99/39373 | 8/1999 |
| WO | WO-99/64967 | 12/1999 |
| WO | WO-00/04422 | 1/2000 |
| WO | WO-00/04458 | 1/2000 |

OTHER PUBLICATIONS

"Servlet/AppletJHTML Authentication Process with Single Sign-On", Research Disclosure 429128, IBM Corporation, 4 pgs, Jan. 2000.

Hewitt, John R. et al., "Securities Practice And Electronic Technology," Corporate Securities Series, (New York: Law Journal Seminars-Press) 1998, title page, bibliography page, pp. 4.29-4.30.

Reardon, Marguerite, "A Smarter Session Switch: Arrowpoint's CS Session Switches Boast The Brains Needed For E-Commerce," Data Communications, Jan. 1999, title page, pp. 3, 5, 18.

* cited by examiner

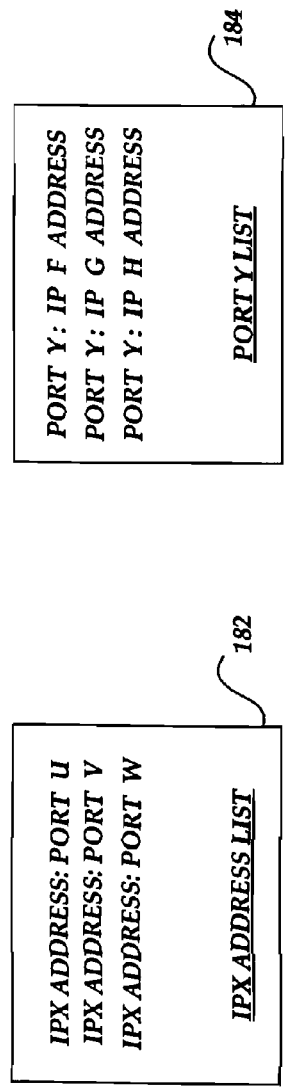
FIG. 9A
FIG. 9B
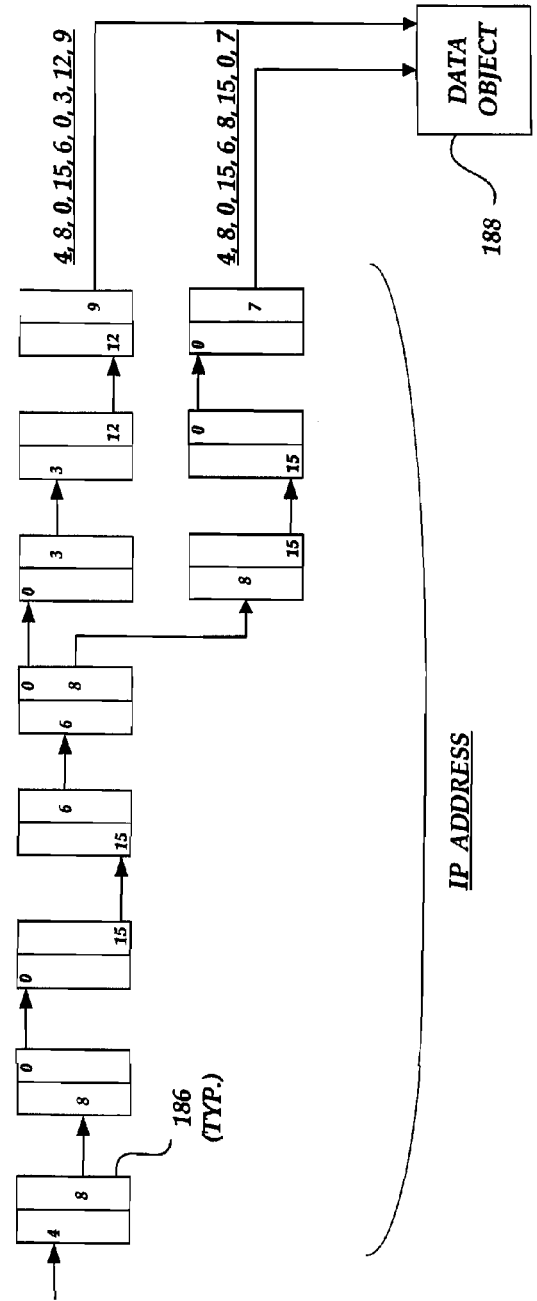
FIG. 10

METHOD AND SYSTEM FOR NETWORK LOAD BALANCING WITH A COMPOUND DATA STRUCTURE

CROSS-REFERENCE TO RELATED APPLICATION

This utility patent application is a continuation U.S. patent application Ser. No. 09/596,796 filed on Jun. 19, 2000, and entitled "Method And System For Network Load Balancing With A Compound Data Structure," the benefit of which is claimed under 35 U.S.C. §120, and further claims the benefit under 35 U.S.C. § 119(e) of U.S. Provisional Application No. 60/140,272, filed Jun. 18, 1999, each of which are incorporated by reference.

FIELD OF THE INVENTION

The present invention relates to methods of implementing different types of data structures in database systems, and in particular, to a complex data structure for retrieving data from a database.

BACKGROUND OF THE INVENTION

Data such as letters, numbers, and words are often maintained and stored in different types of data structures that complement their eventual with an application program. Since a List data structure enables the storing of data objects in an ordered set, this data structure is typically employed with an application program that often retrieves several sequentially related data objects at a time. For example, a multi-media player program usually generates streaming video from sequentially ordered data objects in a List data structure. Although retrieval times for large numbers of sequentially ordered or related data objects can be improved by the use of a List data structure, it may not always be the optimal data structure for retrieving individual and/or several non-sequential or unrelated data objects from a large set of data objects. It is well known that the maximum amount of time to locate an individual data object on a list increases as the number of data objects referenced by the list increase.

Another type of data structure is the Trie, which is often used with an application program that requests individual and/or several non-sequential or unrelated data objects. A Trie stores data in each transition between each node in a multi-level data structure, rather than at the node itself. In this way, all of the transitions in the path between the root and each leaf represent the data object (key) and each transition between each node in the path is associated with a single character/number of the key. Since the nodes themselves are unlabeled, each transition between each node is labeled with a particular character/number. Also, the Trie data structure facilitates the calculation of a constant maximum amount of time to retrieve a stored data object based on the number of levels (nodes associated with the number of alphanumeric characters in the longest data object) in the Trie, e.g., 0 (1). Thus, the maximum search time for a given number of levels in a Trie data structure remains relatively constant as the actual number of data objects stored in the data structure increases.

For example, a dictionary program often employs a Trie data structure to store words and provide relatively constant maximum search times as the number of words (but not their length) in the dictionary increase. In a Trie data structure for a dictionary program, every character in the alphabet (A through Z) is partitioned into individual and disjoint main level search nodes. Also, the total number of search node levels in a Trie data structure for a dictionary corresponds to the number of characters in the dictionary's longest possible word.

Although the List and Trie data structures can complement the operation of particular application programs, there are many other types of application programs that can generate requests for both individual/unrelated and sequential/related data objects. A facility that could employ a particular request generated by an application program to choose a type of data structure most suited to reference and retrieve requested data would be an improvement over the prior art. Also, a data structure that could provide access by one or more unique keys to the same data and enable the automatic removal of all references to deleted data would complement the operation of application programs that generate different types of requests.

A more complete appreciation of the invention and its improvements can be obtained by reference to the accompanying drawings, which are briefly summarized below, to the following detail description of presently preferred embodiments of the invention, and to the appended claims.

SUMMARY OF THE INVENTION

The invention provides for employing a complex data structure to optimize the retrieval of data from a data store over a network. The complex data structure includes two separate sub-data structures (Trie and List) that separately reference the same data objects in a data store. The complex data structure employs a functional interface to determine which data structure matches a particular function request for data. A Trie sub-data structure is used to fulfill a single data object request. The List sub-data structure is employed with function requests related to several data objects. Each data object is associated with a parent object that includes a list of every reference to the data object in both the Trie and List sub-data structures. When a data object is subsequently deleted, the parent object list is employed to automatically delete every reference to the deleted data object in both the Trie and List sub-data structures. A collector object is a type of data object that is associated with a member object and which includes a list of other related data/collector objects. When data associated with the collector object is requested, other data associated with the other data/collector objects on the member object list are automatically retrieved. The complex data structure can also use a Hash sub-data structure to retrieve single data objects.

In accordance with the invention, the above and other problems are solved by employing a plurality of data structures to optimize the retrieval of at least one data object over a network. Each data object is stored in a data store and each data object is separately referenced in each of the plurality of data structures. In response to a request for one data object, one of the plurality of data structures is automatically determined to be best suited to retrieve the one data object. The determined data structure is employed to locate and retrieve the one data object from the data store. Also, in response to a request for a plurality of related data objects, another one of the plurality of data structures is automatically determined to be best suited to retrieve the plurality of related data objects. The other one of the plurality of data structures is employed to locate and retrieve the plurality of related data objects from the data store. Additionally, in response to a request to delete at least one data object, each reference to each deleted data object in the plurality of data structures is automatically deleted.

In accordance with other aspects of the invention, a parent object is associated with each data object. Each parent object identifies each reference for the associated data object in the plurality of data structures. When a data object is deleted, the parent object associated with the deleted data object is employed to identify each reference for the deleted data object in the plurality of data structures and each reference is deleted.

In accordance with still other aspects of the invention, the data object can be a collector object that is associated with a member object that identifies one or more other data objects that are related to the collector object. The member object is employed to reference and retrieve each data object related to the collector object when the collector object is retrieved.

In accordance with yet other aspects of the invention, the plurality of related data objects have at least one related characteristic, including port, IP address, and type. Also, the plurality of data structures may include List, Hash, and Trie.

In accordance with other aspects of the invention, one of the plurality of data structures can be a Trie data structure that identifies a key in the request for a data object. The Trie data structure divides the key into segments and each segment is employed to search the Trie data structure and locate a reference to the requested data object. The key can represent an IP address and/or a port. Also, each segment can be represented by at least one bit.

In accordance with still other aspects of the invention, the data store is a database. The database can be a relational, object-oriented, or some combination of the two, database. Also, the data store can be a data warehouse.

The invention may be implemented as a computer process, a computing system or as an article of manufacture such as a computer program product or computer readable medium. The computer program product may be a computer storage medium readable by a computer system and encoding a computer program of instructions for executing a computer process. The computer program product may also be a propagated signal on a carrier readable by a computing system and encoding a computer program of instructions for executing a computer process.

These and other features as well as advantages, which characterize the invention, will be apparent from a reading of the following detailed description and a review of the associated drawings.

BRIEF DESCRIPTION OF THE DRAWINGS

FIG. 9A shows a block diagram of an IP address list;

FIG. 9B illustrates a block diagram of a Port list;

FIG. 10 shows a block diagram of an eight level Trie data structure shown in greater detail;

DETAILED DESCRIPTION OF THE PREFERRED EMBODIMENT

An embodiment of the invention provides for employing a complex data structure to optimize the retrieval of data from a data store over a network. The complex data structure may include multiple data structures, e.g., List and Trie, which in parallel separately reference the same data objects in a data store. For a particular functional request to retrieve data, the complex data structure examines the request to determine whether it is associated the List or Trie data structures. In most cases, the Trie data structure is associated with a functional request for a single data object and the List data structure is associated with functional request to retrieve several related data objects.

Each data object is associated with a parent object that includes a list of every reference to the data object in both the Trie and List data structures. When a data object is subsequently deleted, the complex data structure employs the parent object list to automatically delete every reference to the deleted data object in both the Trie and List data structures. Additionally, the complex data structure provides for a particular type of data object, i.e., a collector object, that is associated with a member object and which includes a list of other related data/collector objects that are referenced in a sub-tree below the node level of the collector object in the Trie data structure. Also, when the data associated with a collector object is requested, other data associated with the other data/collector objects on the member object list are automatically retrieved.

Another embodiment of the invention may employ a complex data structure that includes a List data structure and Hash data structure, which can be used with the List data structure to process functional requests for single objects. Generally, the Hash data structure requires less overhead, e.g., memory and processor cycles, than a Trie data structure to process a request for data. However, the Hash data structure would not support collector objects as discussed in greater detail below.

The logical operations of the various embodiments of the invention are implemented (1) as a sequence of computer implemented actions or program modules running on a computing device; and/or (2) as interconnected hardware or logic modules within the computing device. The implementation is a matter of choice dependent on the performance requirements of the computing system implementing the invention. Accordingly, the logical operations making up the embodiments of the invention described herein are referred to alternatively as operations, actions, or modules. Generally, program modules include routines, programs, objects, components, data structures, etc. that perform particular tasks or implement particular abstract data types. Typically, the functionality of program modules may be combined or distributed in various embodiments.

Figure 1A:
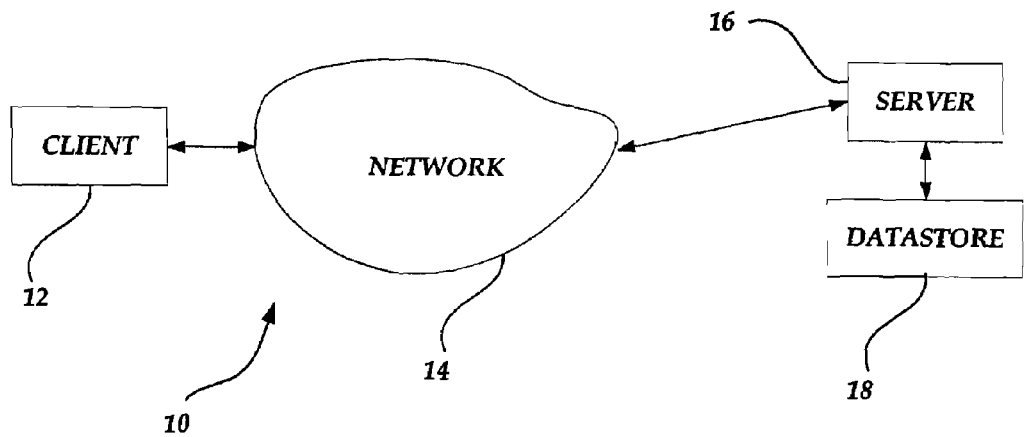
FIG. 1A illustrates a block diagram of a client-server operating environment used in an embodiment of the invention.

FIG. 1A illustrates one embodiment of an overview 10 of a suitable client-server operating environment in which the invention may be implemented. A client 12 is in communication with a server 16 over a network 14 such as the Internet. The server 16 is in communication with a data store 18 for retrieving data that may be requested by the client 12. In response to a request from the client 12 over the network 14, the server 16 can access the data store 18 and provide the requested data in an appropriate format to the client.

Figure 1B:
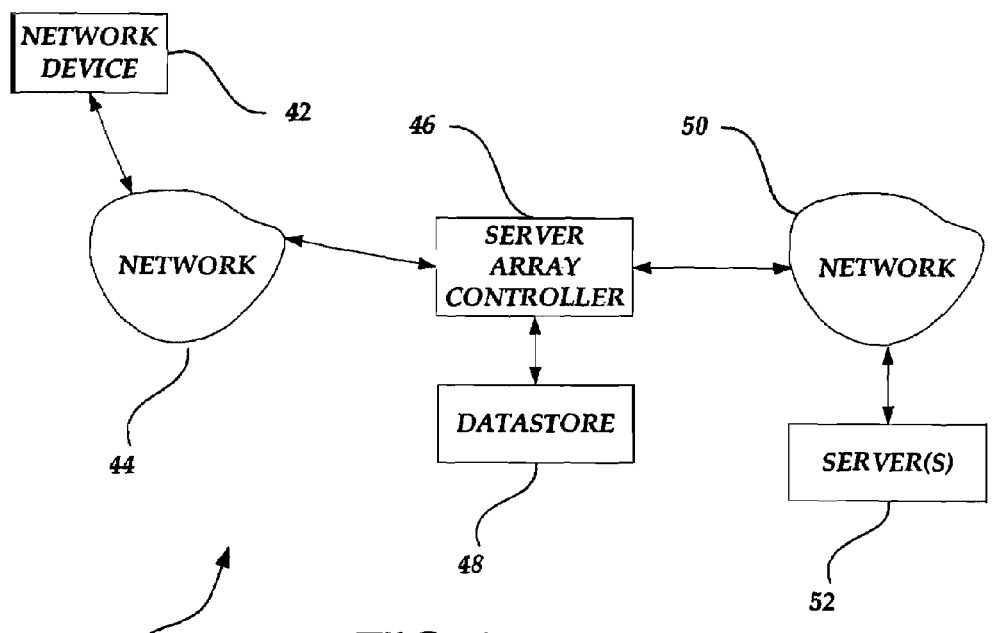
FIG. 1B illustrates a block diagram of a client-server operating environment used with a server array controller in another embodiment of the invention.

FIG. 1B illustrates another embodiment of an overview 40 of an exemplary operating environment in which the invention may be implemented. A network device 42 is in communication with a server array controller 46 over a network 44 such as the Internet. The network device 42 may be a server, client, router, firewall, cache, or another server array controller and the network 44 may also be a local area network or a wide area network for an enterprise. The server array controller 46 is in communication with a data store 48 that stores the address for at least one of a pool of virtual servers 52 managed by the server array controller 46. The virtual servers 52 are in communication over another network 50 with the server array controller 46, which manages the requests for data from the virtual servers. The server array controller 46 uses the information in the data store 48 to transform and direct traffic from one network device to another. The other network 50 may be a local area network, wide area network or the Internet.

Figure 2:
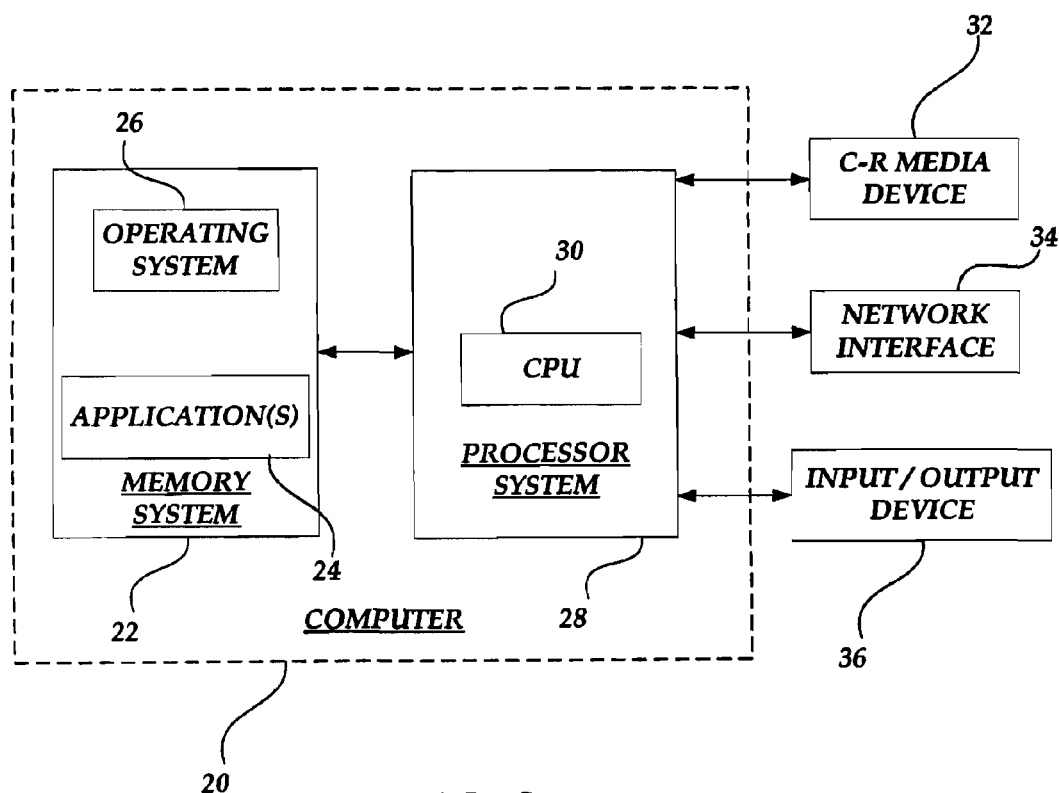
FIG. 2 shows a block diagram of a computing device used in an embodiment of the invention.

FIG. 2 illustrates one embodiment of a suitable operating environment for a computer 20 in which the invention may be implemented. The computer 20 is only one embodiment of a suitable operating environment and is not intended to suggest any limitation as to the scope of use or functionality of the invention. Other well known computing systems, environments, and/or configurations that may be suitable for use with the invention include, but are not limited to, personal computers, server computers, client computers, laptop devices, multiprocessor devices, microprocessor based systems, programmable consumer electronics, network PCs, minicomputers, mainframe computers, client-server environments, distributed computing environments that include any of the above systems or devices, and the like.

FIG. 2 shows functional components of the computer 20, including a processor system 28, a CPU 30, a memory system 22, a network interface 34, a computer readable media device 32 and an input/output device 36. The memory system 22 generally includes both volatile memory (e.g., RAM) and non-volatile memory (e.g., ROM, PC cards, etc.). An operating system 26 is resident in the memory system 22 and executes on the CPU 30, such as UNIX®, Linux®, or the Windows NT® operating system from the Microsoft® Corporation.

One or more application programs 24 are loaded into the memory system 22 and run on the operating system 26. Examples of applications include email programs, scheduling programs, network management programs, PIM (personal information management) programs, word processing programs, spreadsheet programs, Internet browser programs, and so forth. The computer 20 has a power supply (not shown), which can be implemented as one or more batteries or might further include an external power source that overrides or recharges built-in batteries, such as an AC adapter.

The computer 20 may operate with at least some form of computer readable media. Computer readable media can be any available media that can be accessed by the computer readable media device 32. By way of example, and not limitation, computer readable media may comprise computer storage media and communications media. Computer storage media includes volatile and nonvolatile, removable and non-removable media implemented in any method or technology for storage of information such as computer readable instructions, data structures, program modules, or other data. Computer storage media includes, but is not limited to, random access memory (RAM), read only memory (ROM), electrically erasable programmable read only memory (EEPROM), flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the computer 20. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

Figure 3:
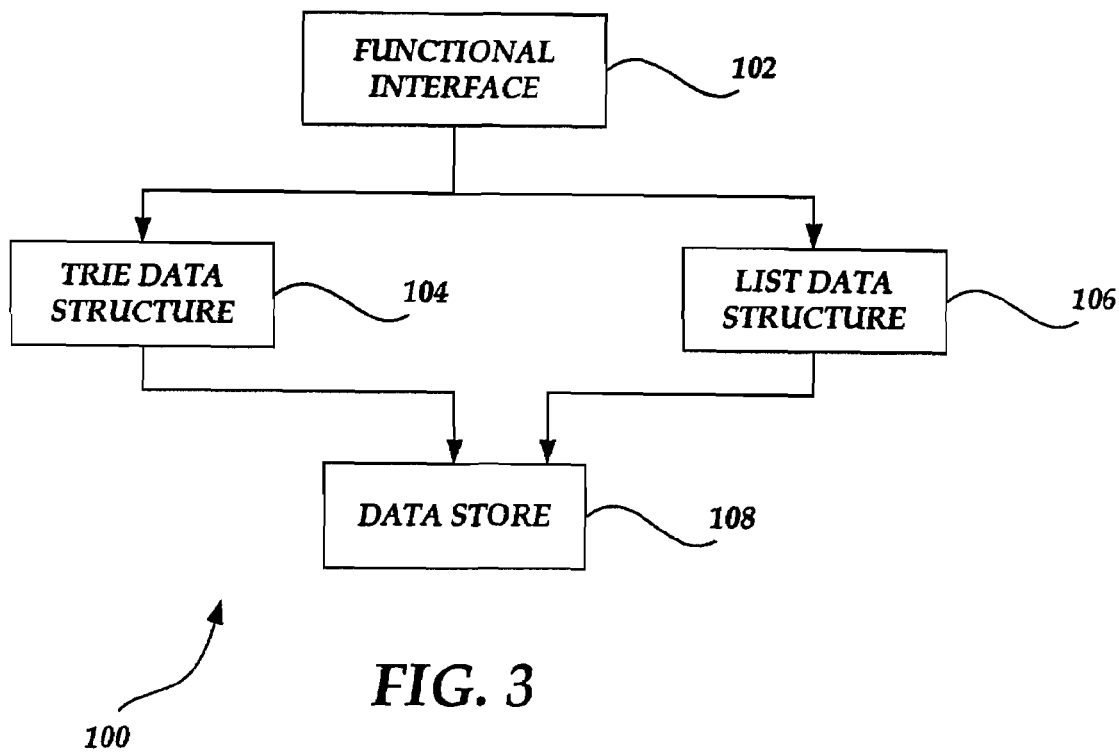
FIG. 3 illustrates a block diagram of an overview of the complex data structure that includes a List data structure and a Trie data structure for one embodiment of the invention.

FIG. 3 shows an overview 100 of a complex data structure employed by the invention to provide optimal retrieval of requested data from a data store 108. A Functional Interface 102 processes each request for data. The functional interface is in communication with a List data structure 104 and a Trie data structure 106 and it determines which data structure matches the particular functional request for data. The Trie 104 and List 106 data structures provide parallel access to data stored in the data store 108. Although not shown, another embodiment of the invention may employ a Hash function data structure (instead of a Trie data structure) with the List data structure to optimize the retrieval of data in response to a functional request.

Objects in the data store 108 are retrieved/added/deleted through the Functional Interface 102. Retrieval functions are specific to either the Trie data structure 104 or the List data structure 106. For the Trie data structure 104, there is a Trie retrieval function that accepts a top level accessor object and a unique key and returns a container object, e.g., a data object or a collector object which are discussed in greater detail below. The List data structure 106 supports several retrieval functions, including mid level list accessor objects, changing the current state of a list, and retrieving at least one of the container objects that is a member of a list. Since the mid level list accessor objects reference associated top level Trie accessor object, they do not need to be specified by list functions.

A Trie retrieval function is generally employed to find a single container object when at least one of the Trie keys that give access to the object is known. For example, a Trie retrieval occurs when a data packet arrives at an appliance on an interface where a network address translation data store is not empty. In this example, a six byte source IP address and port can be used to attempt to retrieve information about a currently active network address translation connection. When the retrieval fails, the four byte source IP address can be used to attempt to find a network address translation initiator object which is stored as a collector object in the same complex data structure. If an initiator is found, a connection is added to the data store under the six byte source IP address and port retrieval path. At the same time, a connection object will be automatically added to the initiator object's member list because the initiator object is a collector object with a retrieval path that is the prefix of the connection object's retrieval path.

The list retrieval functions are used whenever the appliance needs to sequentially access a group of container objects. For example, a connection in a network address translation data store can be deleted when it has not been used for a length of time. In this case, an appliance could periodically step through part of the list of all connection objects in the data store to determine whether some connections should be deleted.

In another example, both Trie and List functions may be used when a request is received for information about all of the network address translation connection objects that were created using an initiator object identified by a four byte IP address. In this case, the initiator object is retrieved using the Trie retrieval function and a four byte key. Then using the member list of the initiator object, the connection objects collected by the initiator are sequentially retrieved.

Figure 4A:
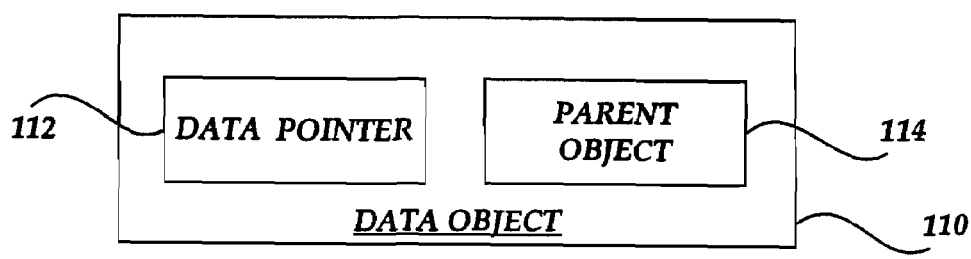
FIG. 4A shows a block diagram of a data object.

FIG. 4A illustrates a data object 110 that includes a pointer 112 to the actual location of the requested data. A parent list (not shown) identifies a parent object 114 that is associated with the data object 110. The parent list identifies each parent object that references the data object in each data structure (List and Trie). When the data object 110 is subsequently deleted, the parent list is employed to automatically delete every parent object 114 in the List and Trie data structures that reference the deleted data object.

Figure 4B:
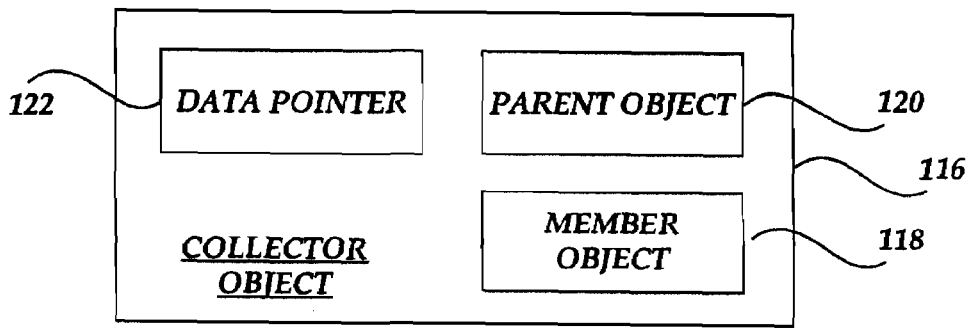
FIG. 4B illustrates a block diagram of a collector object.

FIG. 4B shows a collector object 116, which is similar in some ways to the data object 110 illustrated in FIG. 4A, e.g., the collector object includes a data pointer 122 to the actual location of the requested data and a parent object 120 with a list identifying each reference to the collector object in both data structures. However, the collector object 116 further comprises a member object 118 with a list that identifies every other data object that is related to the collector object. When the data associated with the collector object 116 is retrieved, the invention employs the member object 118 to also automatically retrieve the data associated with the other related data objects on the member list.

Additionally, each collector object automatically adds all of the objects (data and/or collector) to its member object from the sub-tree (node levels) in the Trie data structure below the reference to the collector object. Thus, when a collector object is referenced by a Trie leaf node, the collector object will have an empty list in its member object.

In one embodiment of the invention, an add function automatically adds an object to the list for the member object of a collector object when the added object is added beneath the existing level of the collector object in a sub-tree of the Trie data structure. Additionally, when another add function is employed to add a new collector object to the Trie data structure at a level above the levels of previously existing objects in a sub-tree of the Trie data structure, these objects are automatically added to the list in the member object associated with the new collector object.

Figure 5:
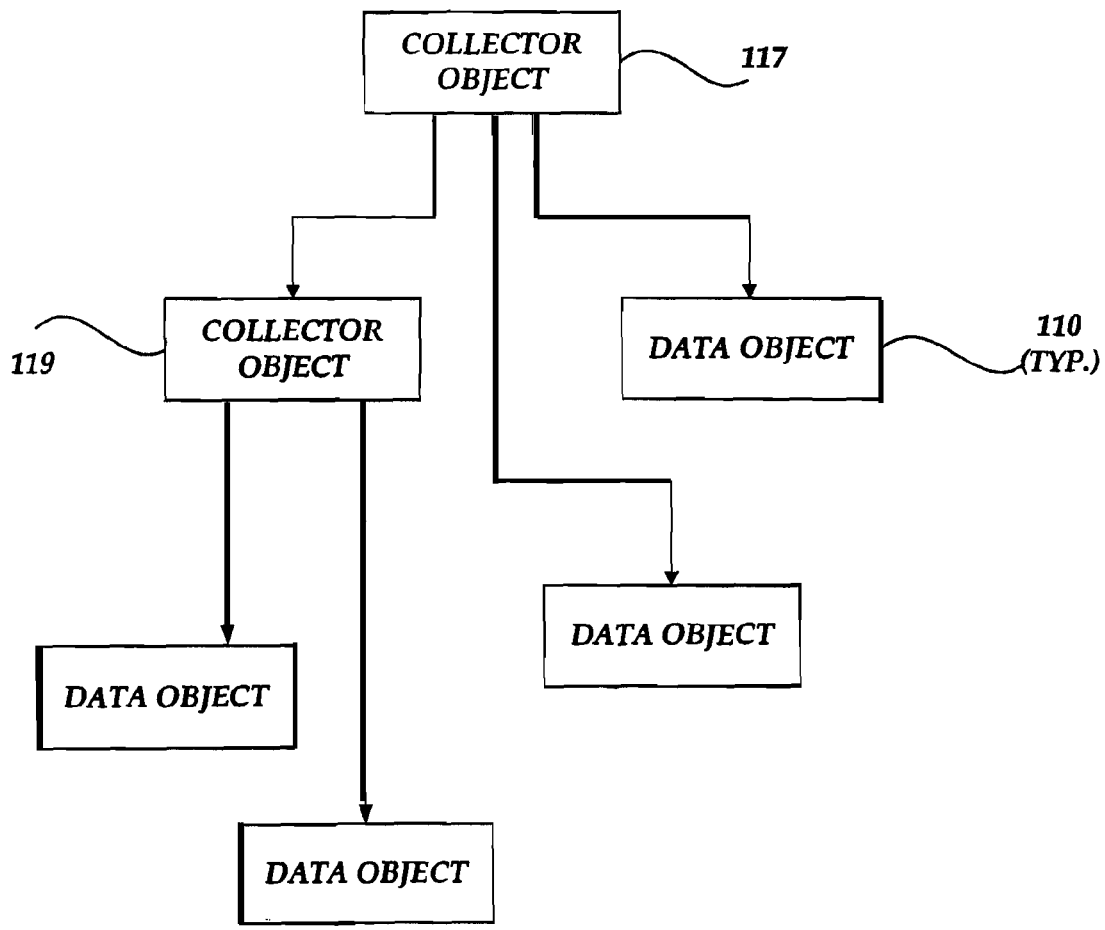
FIG. 5 shows a block diagram of nested collector and data objects.

FIG. 5 shows an overview 124 of one embodiment enabling a single collector object to reference other data objects and collector objects. A collector object 117 includes a member object (not shown) with a list that references all of the other data objects 110 and another collector object 119 disposed in a sub-tree below the reference to the collector object 117 in the Trie data structure. The other collector object 119 includes another member object (not shown) with another list that references the other data objects 110 disposed in another sub-tree below the reference to the collector object 119 in the Trie data structure. Thus, when the data associated with the collector object 117 is requested, other data associated with four other data objects 110, and another collector object 119 will be automatically retrieved.

Figure 6:
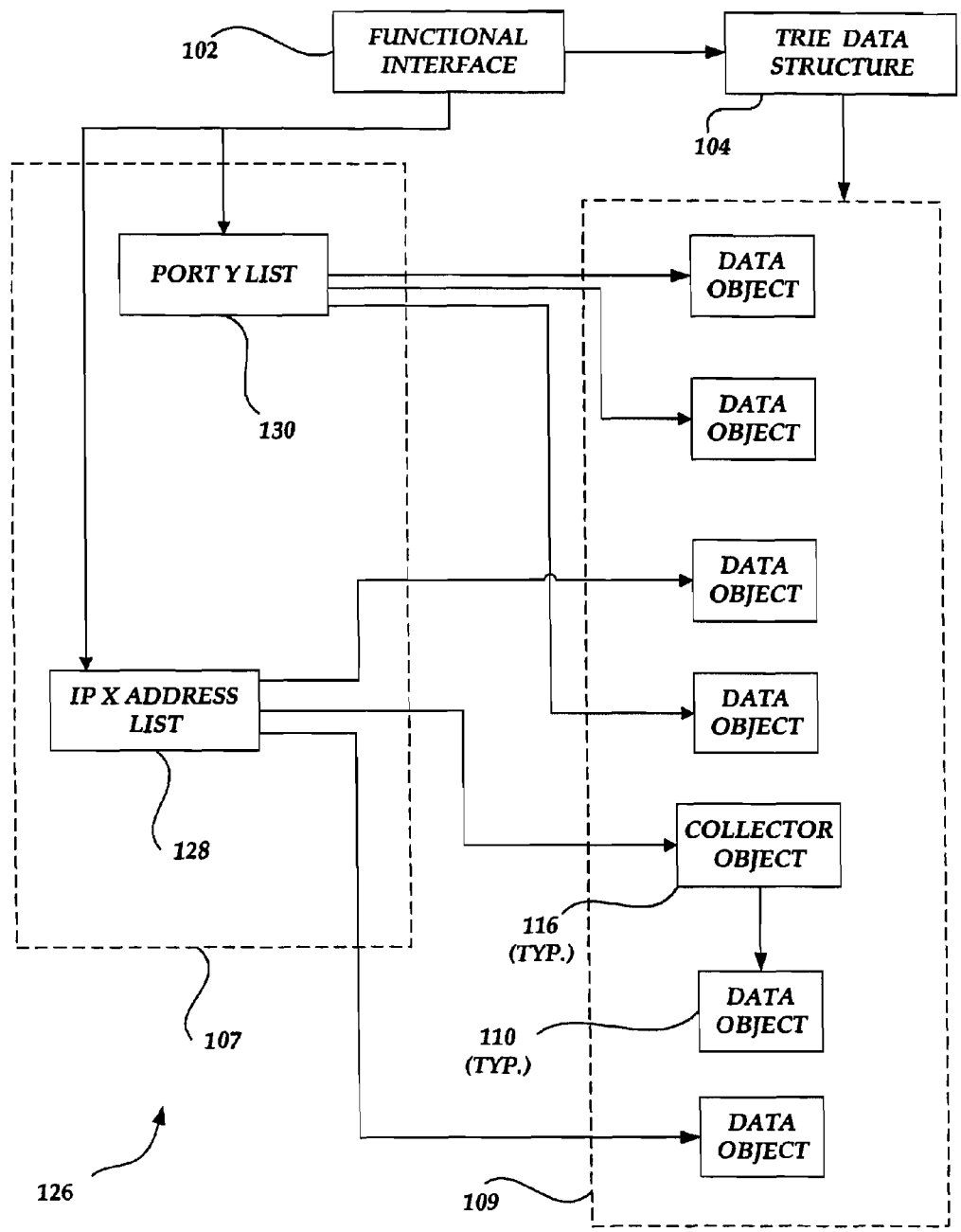
FIG. 6 illustrates a block diagram of an overview of the complex data structure with greater detail shown for the List data structure referencing data objects and collector objects.

FIG. 6 illustrates an overview 126 that provides greater detail regarding the referencing of data/collector objects in a data store 109 by an exemplary List data structure 107. Although the Functional Interface 102 and the Trie data structure 104 are represented in FIG. 6, their interaction with the data store 108 and the List data structure 107 is discussed in greater detail above and below. A Port list 130 includes references to three data objects 110 which are associated with a particular port ("Y"), but have different IP addresses. FIG. 9B shows an exemplary Port list 184 that includes references to three separate data objects with the same port ("Y") and different IP addresses ("F", "G", and "H").

Returning to FIG. 6, an IP address list 128 references two data and one collector objects that are associated with different Ports, but have the same IP address ("X"). FIG. 9A illustrates an exemplary IP address list 182 that includes references to three separate data objects with the same IP address ("X") and different Ports ("U", "V", and "W").

Figure 7:
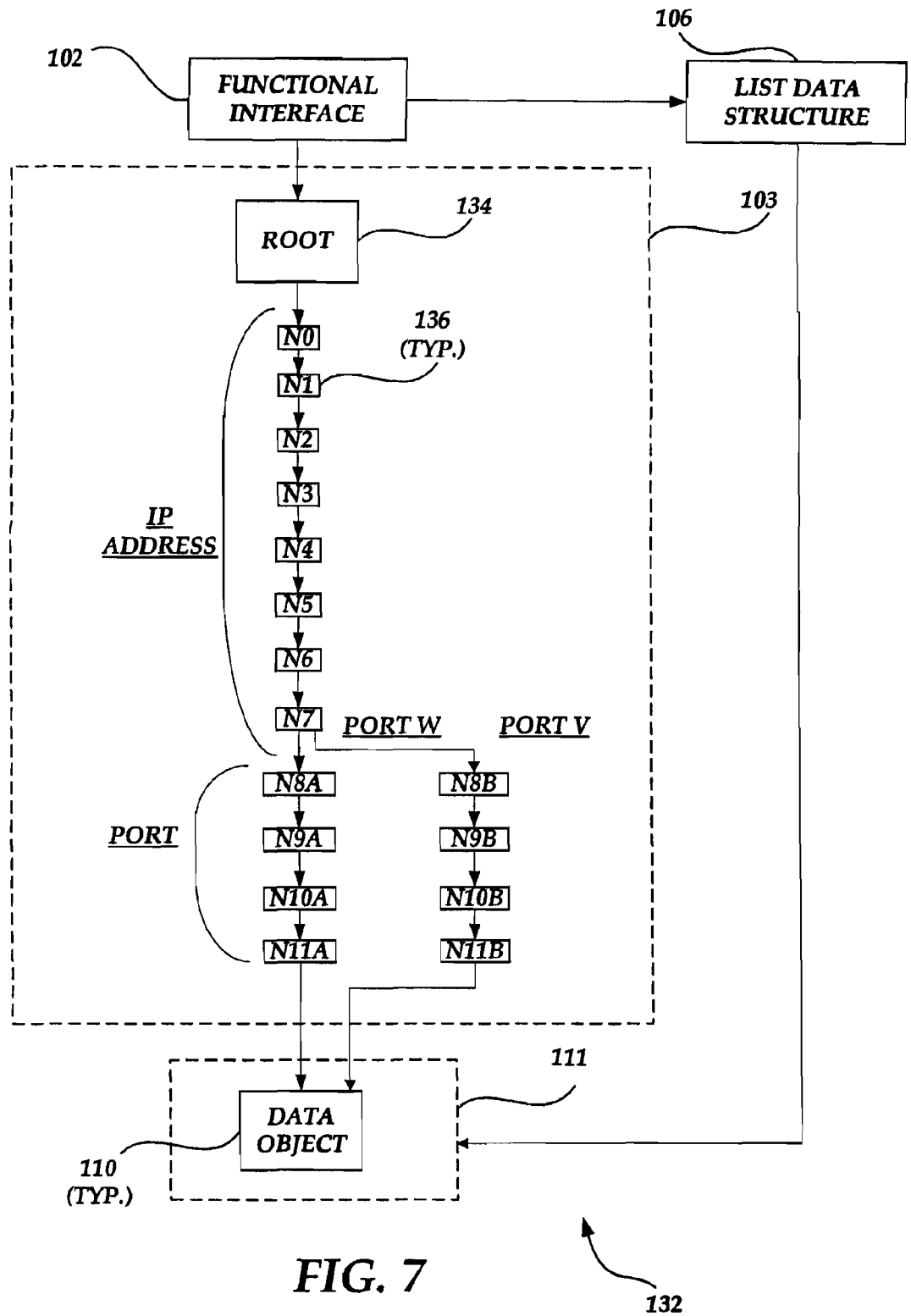
FIG. 7 shows a block diagram of an overview of the complex data structure with greater detail shown for the Trie data structure referencing data objects.

FIG. 7 illustrates an overview 132 that provides greater detail regarding the referencing of data/collector objects in a data store 111 by an exemplary Trie data structure 103. Although the Functional Interface 102 and the List data structure 106 are represented in FIG. 7, their interaction with the data store 111 and the Trie data structure 103 is discussed in greater detail above and below. Each transition between each node 136 in the twelve levels of the Trie data structure 103 is associated with a four bit key segment having the decimal range of 0 to 15. In combination, these key segments can serve as the reference to the data object 110 in the data store 111. In this example, each of the two exemplary paths through the twelve Trie nodes correspond to the same IP address and different ports (Port W and Port V) that are associated with the same data object 110 in the data store 111.

In greater detail, FIG. 10 shows two paths through eight levels of Trie nodes 186 that correspond to two different IP addresses and which reference the same data object 188. The sequential combination of each transition value between each of the eight Trie nodes 186 corresponds to a particular IP address. At each Trie node, four bits are employed to indicate incoming and outgoing transition pointers associated with any of 16 possible values for each transition between each node. For this example, the sequential combination of the eight transition values represent two 32 IP bit addresses, as follows: (4, 8, 0, 15, 6, 0, 3, 12, 9) and (4, 8, 0, 15, 6, 8, 15, 0, 7).

Figure 8:
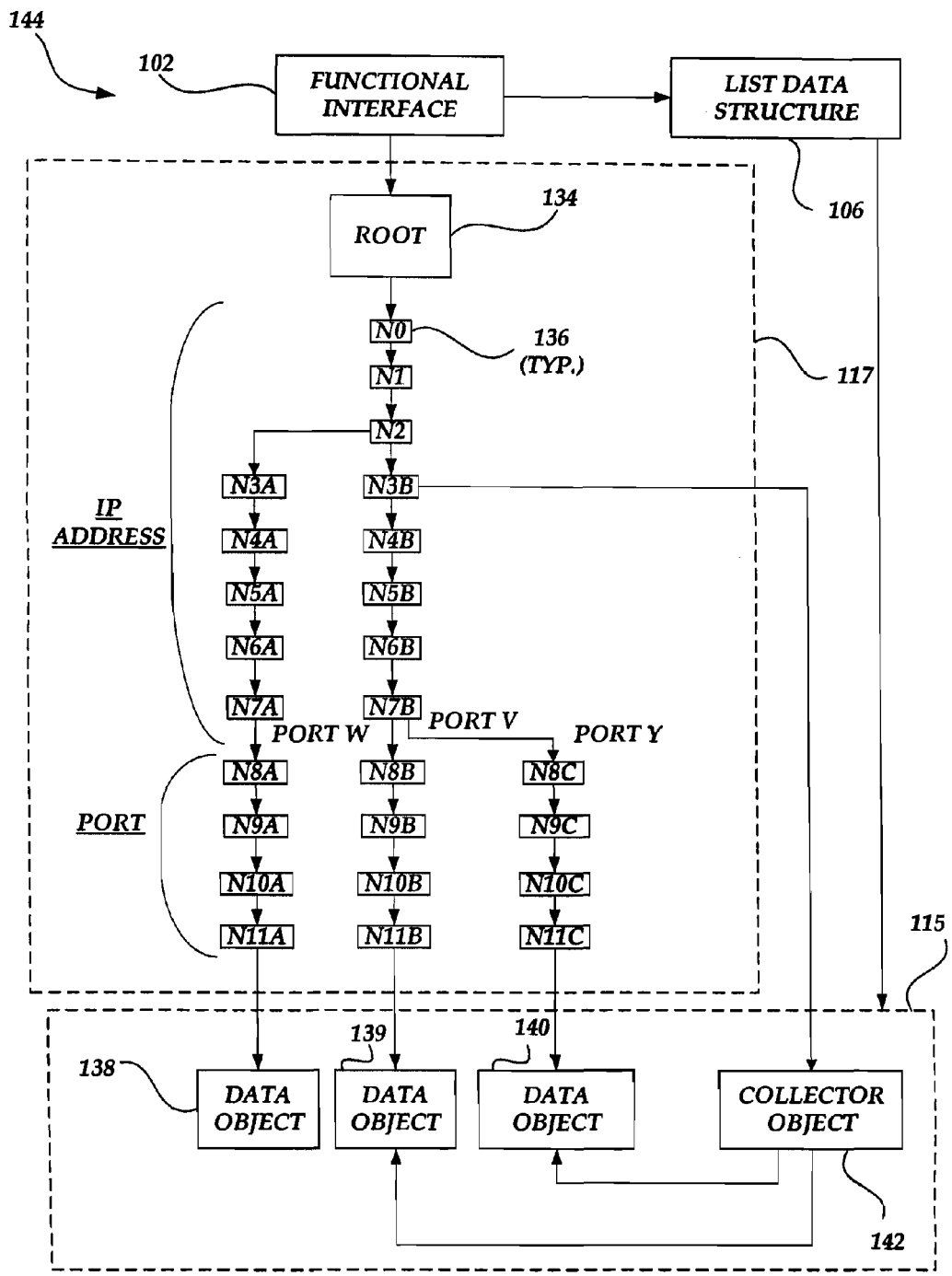
FIG. 8 illustrates a block diagram of an overview of the complex data structure with greater detail shown for the Trie data structure referencing data objects and collector objects.

FIG. 8 shows an overview 144 that provides greater detail regarding the referencing of exemplary data/collector objects in a data store 115 by an exemplary Trie data structure 117. Although the Functional Interface 102 and the List data structure 104 are represented in FIG. 8, they are discussed in greater detail above and below. Each transition between each node 136 in the path through the twelve levels in the Trie data structure 117 is associated with a four bit key segment. In this case, the three complete paths through all twelve levels of the Trie nodes reference separate data objects associated with different ports and/or IP addresses, i.e., data object 138 is associated with a different port and IP address and data objects 139 and 140 are associated with the same IP address and different ports.

Additionally, a collector object 142 is referenced by the transition values associated with a path through the first four levels of the Trie data structure and which represent the first four values in a 32 bit IP address. In this case, the collector object 142 has automatically included a member object (not shown) that lists a reference to each data object (139 and 140) that is disposed in the sub-tree (node levels) below the reference to the collector object 142. Since the first four key segments of the collector object 142 and the data objects 139 and 140 are the same, these data objects were automatically included in the member object for the collector object 142.

Figure 11:
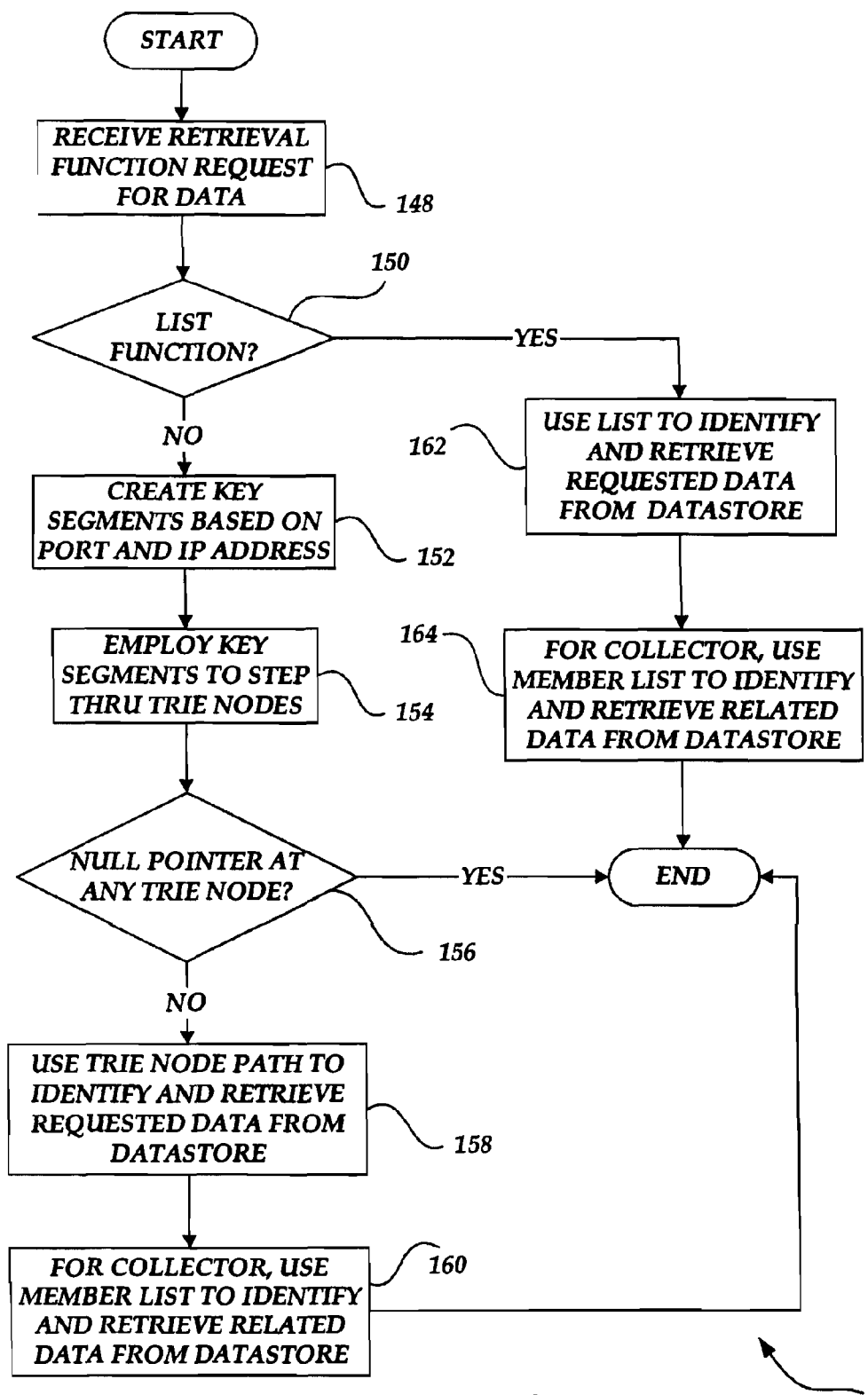
FIG. 11 is a flow diagram illustrating the operational characteristics for determining one of a plurality of data structures best suited to reference and retrieve a requested data object.

FIG. 11 illustrates a flow chart 146 that shows the actions for one embodiment of the invention for retrieving data in response to a request. Moving from a start block, the operational flow advances to a block 148, where the Functional interfaces receives a function request for data at an IP address and port. The operational flow pushes to a decision block 150, where a determination is made whether the function request is a List function. If so, the operational flow advances to a block 162 where the List data structure is employed to locate a data object at the provided port and IP address and retrieve the requested data. The operational flow moves to a block 164, where when the data object is determined to be a "collector" object, a member object associated with the collector object is employed to retrieve other related data identified by other data objects that are referenced by the member object. Next, the operational flow moves to the End block and resumes calling program modules.

Alternatively, when the determination at the decision block 150 is false, the flow moves to a block 152 where key segments are created for a Trie data structure based on the port and IP address associated with the requested data. In one embodiment of the invention, each key segment is four bits. In this example, four key segments are created for a 16 bit port and eight key segments are generated for a 32 bit IP address.

The operational flow moves to a block 154 where each key segment is employed to sequentially transition along a path through all of the node levels in the Trie data structure. Advancing to a decision block 156, a determination is made whether a null pointer value was found at any level in the path through the nodes of the Trie data structure. If true, the operational flow moves to an End block and resumes calling program modules.

Alternatively, when the determination at the decision block 156 is false, the operational flow advances to a block 158 where the complete path through the Trie data structure is employed to reference a data object and retrieve the requested data. The operational flow moves to a block 160 where when the referenced data object is determined to also be a collector object, a member list included with the collector object is employed to retrieve related data associated with other data objects on the member list. The operational flow transitions to the end block and resumes calling program modules.

Figure 12:
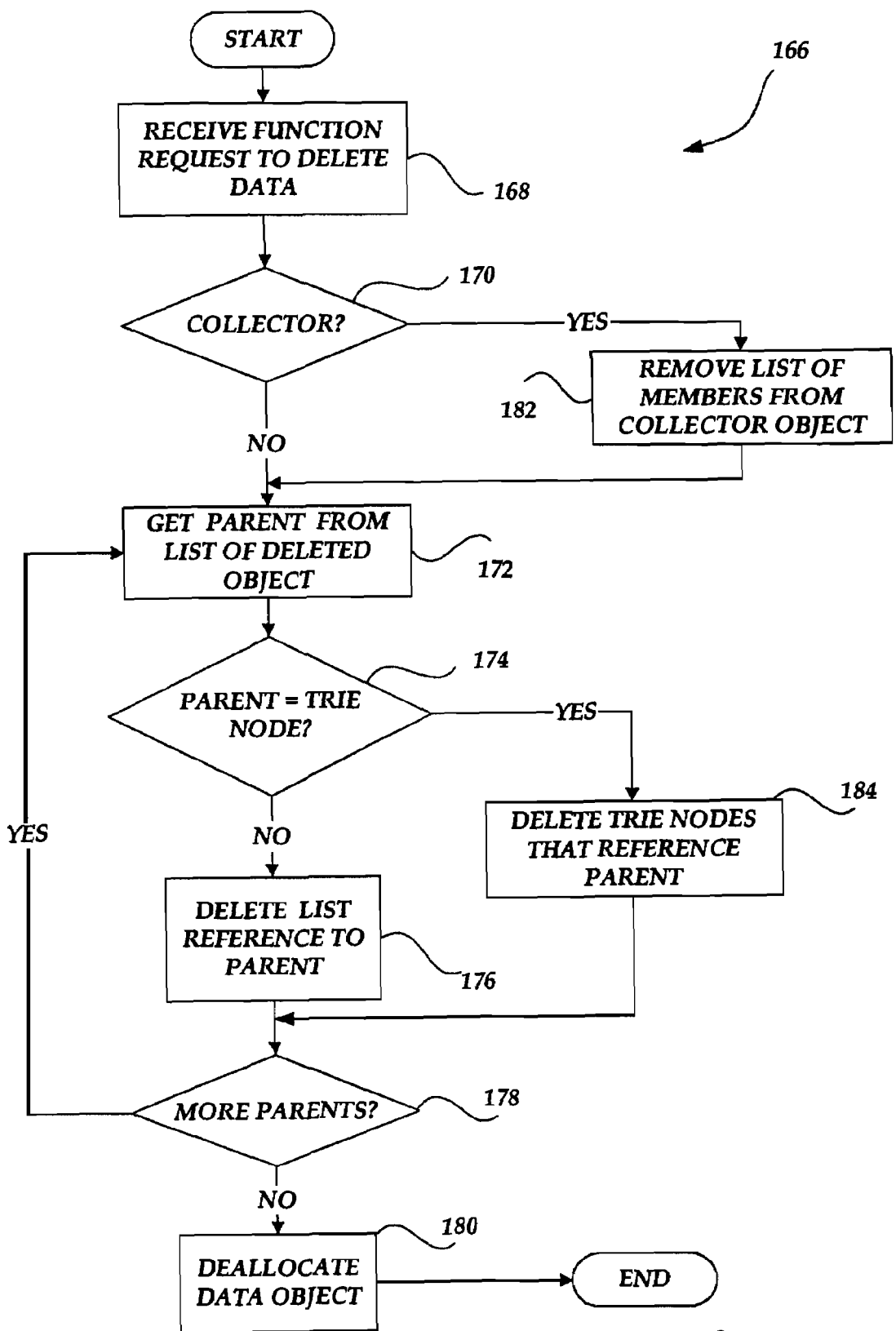
FIG. 12 is a flow diagram illustrating the operational characteristics for deleting each reference to a deleted data object in each of the plurality of data structures.

FIG. 12 illustrates a flow chart 166 that shows the actions for one embodiment of the invention for deleting data in response to a request. Moving from a start block, the flow advances to a block 168, where a function request is received by the Functional Interface to delete data associated with a particular port and IP address. The operational flow transitions to a decision block 170, where the Functional Interface determines whether the data to be deleted is a collector object. If so, the operational flow advances to a block 182 where the list of member objects is removed from the collector object. The operational flow moves to a block 172 where a parent object associated with the data object to be deleted is identified. A list may be associated with the object to be deleted that identifies multiple parent objects. Also, since a parent object is automatically generated for each data object, it is automatically updated until the associated data object is deleted.

Alternatively, when the object to be deleted is determined to not be a collector object at the decision block 170, the operational flow moves directly to the block 172 where substantially the same actions discussed above are performed.

Next, the operation flow advances to a decision block 174 where a determination is made whether the parent object is a trie node. If so, the operational flow moves to a block 184 where every trie node that references this parent object is deleted. The operational flow transitions to a decision block 178 where a determination is made whether more parent objects are included on the list associated with the data object to be deleted. If affirmative, the operational flow loops back to the block 172 and performs substantially the same actions as discussed above. However, when the determination at the decision block 178 is negative, the operational flow moves to a block 180 where the data object to be deleted is deallocated. The operational flow transitions to an end block and resumes calling other program modules.

Alternatively, if the determination at the decision block 174 is negative, i.e., the parent object is not a trie node, then the operational flow advances to a block 176 where the reference in the List data structure to the parent object is deleted. The operational flow moves to the decision block 178 where substantially the same actions discussed above are repeated.

One embodiment of the invention enables each data object in the data store to be accessed by one or more keys in constant time when the Trie data structure is employed to resolve a request for a data object. Each data object in the data store may be accessed by zero or more sequential lists. For one embodiment of the invention, an iterator object is employed to support multiple concurrent list states in the List data structure.

It is envisioned that the data store can be a relational, object oriented or a combination of the two, database. Also, the data space could be a data warehouse.

The above specification, examples, and data provide a complete description of the manufacture and use of the composition of the invention. Since many embodiments of the invention can be made without departing from the spirit and scope of the invention, the invention resides in the claims hereinafter appended.

We claim:

1. An apparatus usable in managing network connections over a network, comprising:
   a network interface for use in receiving and sending data; and
   a processor coupled to the network interface, and operative to perform actions, including:
      storing a plurality of connection data objects in a data store;
      for each stored connection data object, assigning each of a plurality of different data structure types to the same stored connection data object;
      in response to a request for a connection data object, automatically determining one of the plurality of different data structure types best suited to retrieve the requested connection data object; and
      employing the determined data structure type to retrieve the requested connection data object.

2. The apparatus of claim 1, wherein the processor is operative to perform actions, further including:
   associating a parent object with each connection data object, the parent object identifying each reference for the associated connection data object in the plurality of different data structure types; and
   if at least one connection data object is deleted, employing each parent object associated with each deleted connection data object to identify each reference for the deleted connection data object such that each reference to the deleted connection data object is deleted.

3. The apparatus of claim 1, wherein the plurality of connection data objects comprise at least one of a port number, or IP address.

4. The apparatus of claim 1, wherein the apparatus is further configured to operate as a server array controller.

5. The apparatus of claim 1, wherein the requested connection data object represents a network address a virtual server.

6. The apparatus of claim 1, wherein the processor is operative to perform actions, further including:
   employing the requested connection data object to direct network traffic from one network device to another network device.

7. The apparatus of claim 1, wherein the processor is operative to perform actions, further comprising:
   identifying a key in the request for the connection data object, wherein the key represents at least one of an IP address or a port number;
   dividing the key into segments; and
   employing each segment to search one of the plurality of different data structure type to locate the requested connection data object.

8. A computer-storage medium having computer-executable instructions for managing requests over a network, the computer-executable instructions when installed onto a computer enable the computer to perform actions, comprising:
   storing a plurality of network connection data in a data store, wherein for each stored network connection datum each of a plurality of different data structure types is assigned to the same stored network connection datum;
   if one network connection datum is requested, automatically determining one of the plurality of different data structure types best suited to retrieve the one network connection datum and employing the determined data structure type to locate and retrieve the one network connection datum from the data store; and
   in response to a request to delete at least one network connection datum, automatically deleting each reference to each deleted network connection datum in the plurality of different data structure types.

9. The computer-storage medium of claim 8, wherein the machine-executable instructions enable the machine to perform actions, further comprising:
   if a plurality of related network connection data are requested, automatically determining another one of the plurality of different data structure types best suited to retrieve the plurality of related network connection data and employing the determined other one of the plurality of different data structure types to locate and retrieve the plurality of related network connection data from the data store.

10. The computer-storage medium of claim 8, wherein the plurality of different data structure types comprise a Trie data structure type, a list data structure type, and a hash data structure type.

11. The computer-storage The machine-readable medium of claim 8, wherein the machine is configured to operate as at least one of a router, cache device, a firewall, or a server array controller.

12. The computer-storage medium of claim 8, wherein the machine is further configured to employ the network connection data to direct network traffic to an associated virtual server.

13. The computer-storage medium of claim 8, wherein each of the plurality of different data structure types are based on at least one of an IP address or a port number.

14. A system useable in managing network connections over a network including a network interface, comprising:
   a data store that is configured to store a plurality of network connection data; and
   a processor coupled to the network interface, and operative to perform actions, including:
      for each stored network connection data, assigning each of a plurality of different data structure types to the same stored network connection data;
      in response to a request for a network connection data; automatically determining one of the plurality of different data structure types best suited to retrieve the requested network connection data; and
      employing the determined data structure type to retrieve the requested network connection data.

15. The system of claim 14, wherein the determination of one of the plurality of different data structure types is based in part on whether the request includes a key identifying the network connection data.

16. The system of claim 15, wherein the key represents at least one of an IP address, or a port number.

17. The system of claim 14, wherein the processor is operative to perform actions, further comprising:
   in response to a request to delete at least one the plurality of stored network connection data, automatically deleting each reference to each deleted network connection data in the plurality of different data structure types.

18. The system of claim 14, wherein the processor is operative to perform actions, further comprising:
   employing the retrieved network connection data to access a virtual server.

19. The system of claim 14, wherein the network connection data is associated with a network address for at least one virtual server in a pool of virtual servers.

20. The system of claim 14, wherein the network connection data is associated with Network Address Translation (NAT) connections.

* * * * *